US007469305B2

(12) United States Patent
Mirabeau et al.

(10) Patent No.: US 7,469,305 B2
(45) Date of Patent: Dec. 23, 2008

(54) HANDLING MULTIPLE DATA TRANSFER REQUESTS WITHIN A COMPUTER SYSTEM

(75) Inventors: Lucien Mirabeau, Tucson, AZ (US); Tiep Q. Pham, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 11/533,587

(22) Filed: Sep. 20, 2006

(65) Prior Publication Data
US 2008/0126605 A1   May 29, 2008

(51) Int. Cl.
*G06F 13/28* (2006.01)
*G06F 3/00* (2006.01)

(52) U.S. Cl. .............................. 710/22; 710/36; 710/39; 710/42

(58) Field of Classification Search .................... 710/22, 710/36, 39, 42
See application file for complete search history.

(56) References Cited

U.S. PATENT DOCUMENTS

| 6,721,826 B2 | 4/2004 | Hoglund |
| 6,839,824 B2 | 1/2005 | Camble et al. |
| 6,999,999 B2 | 2/2006 | Camble et al. |
| 7,287,114 B2* | 10/2007 | Sullivan ..................... 710/316 |
| 2005/0025119 A1* | 2/2005 | Pettey et al. ................ 370/351 |
| 2006/0015473 A1 | 1/2006 | Swan |

* cited by examiner

*Primary Examiner*—Niketa I Patel
(74) *Attorney, Agent, or Firm*—Dillon & Yudell LLP

(57) ABSTRACT

In response to multiple data transfer requests from an application, a data definition (DD) chain is generated. The DD chain is divided into multiple DD sub-blocks by determining a bandwidth of channels (BOC) and whether the BOC is less than the DD chain. If so, the DD chain is divided by the available DMA engines. If not, the DD chain is divided by an optimum atomic transfer unit (OATU). If the division yields a remainder, the remainder is added to a last DD sub-block. If the remainder is less than a predetermined value, the size of the last DD sub-block is set to the OATU plus the remainder. Otherwise, the size of the last DD sub-block is set to the remainder. The DD sub-blocks are subsequently loaded into a set of available DMA engines. Each of the available DMA engines performs data transfers on a corresponding DD sub-block until the entire DD chain has been completed.

9 Claims, 3 Drawing Sheets

HANDLING MULTIPLE DATA TRANSFER REQUESTS WITHIN A COMPUTER SYSTEM

BACKGROUND OF THE INVENTION

1. Technical Field

The present invention relates to data processing in general, and more particularly, to a method and apparatus for transferring data between applications. Still more particularly, the present invention relates to a method and apparatus for handling multiple data transfer requests from one application within a computer system.

2. Description of Related Art

Within a computer system, a data transfer request by an application is typically encapsulated within a Data Definition (DD) packet that specifies a source, a destination, and a length of the data transfer. A DD chain can be generated by an application when the application needs to make multiple data transfers.

Hardware components known as Direct Memory Access (DMA) engines are commonly utilized to perform data transfer operations, and one DMA engine is usually assigned to handle all data transfer requests from one application. Thus, when there are multiple data transfers requested by an application, all the data transfers have to be handled by a single DMA engine sequentially.

There are several drawbacks with handing multiple data transfer requests from one application in a serial manner. For example, the data transfer rate of a long DD chain is limited by the speed of a single DMA engine. Also, if an error, such as an unrecoverable hardware failure, occurs in the single DMA engine that is handling the long DD chain, the corresponding data transfer operation will fail. Furthermore, computer systems that contain multiple DMA engines may not fully utilize all of the available DMA hardware resources.

Consequently, it would be desirable to provide an improved method and apparatus for handling multiple data transfer requests from one application within a computer system.

SUMMARY OF THE INVENTION

In accordance with a preferred embodiment of the present invention, in response to the receipt of multiple data transfer requests from an application, a data definition (DD) chain is generated for all the data transfer requests. The DD chain is then divided into multiple DD sub-blocks by determining a bandwidth of channels (BOC) and whether or not the BOC is less than the DD chain. If the BOC chain is less than the DD chain, the DD chain is divided by a number of available DMA engines; however, if the BOC is not less than the DD chain, the DD chain is divided by an optimum atomic transfer unit (OATU). If the division yields a remainder, the remainder is added to a last DD sub-block, and a determination is made whether the remainder is less than a predetermined value. If so, the size of the last DD sub-block is set to the OATU plus the remainder. If not, the size of the last DD sub-block is set to the size of the remainder. The DD sub-blocks are subsequently loaded into a set of available direct memory access (DMA) engines. Each of the available DMA engines performs data transfers on a corresponding DD sub-block until the entire DD chain has been completed.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
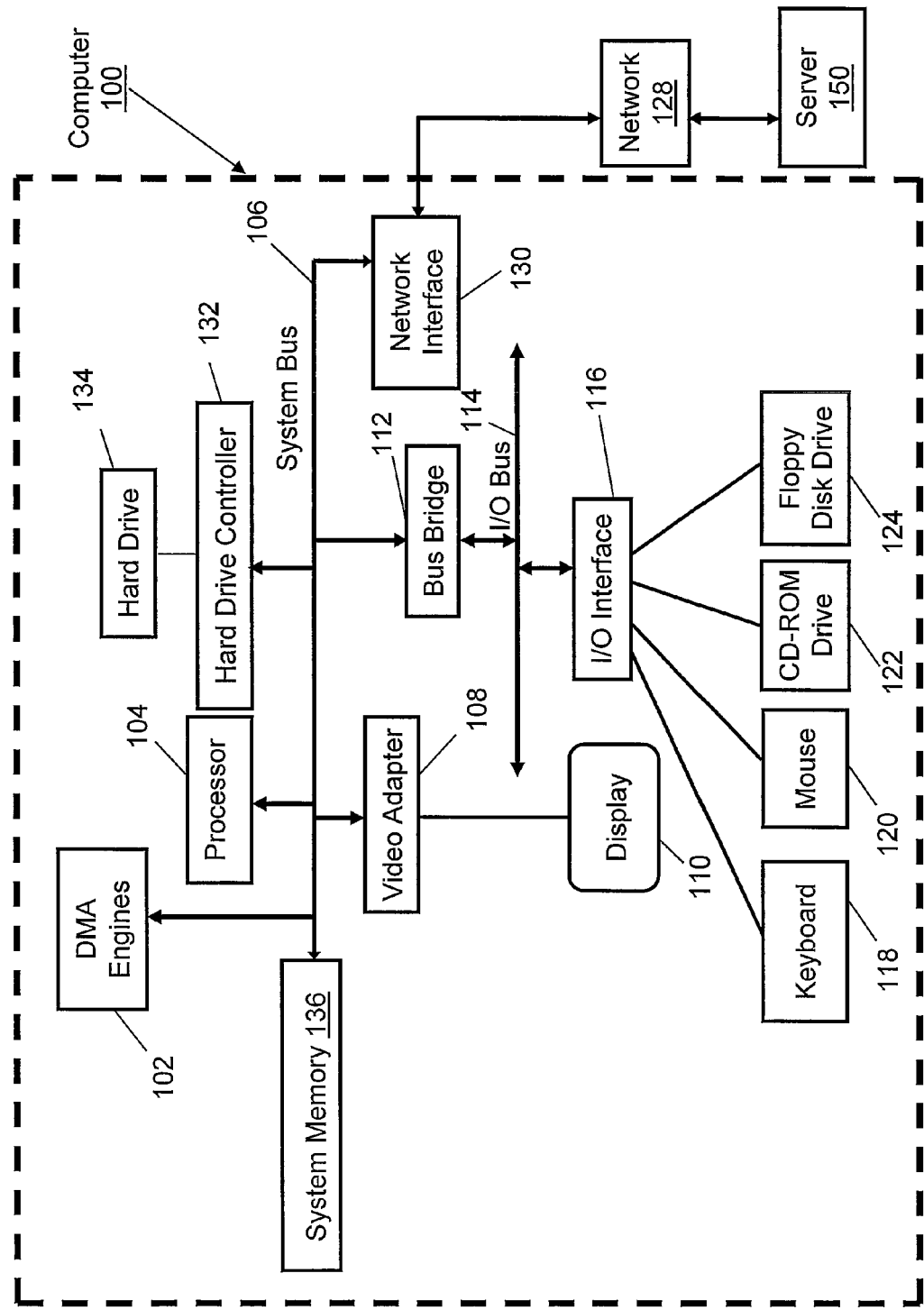
FIG. 1 is a block diagram of a computer system in which a preferred embodiment of the present invention is incorporated.

Referring now to the drawings, and specifically to FIG. 1, there is depicted a block diagram of a computer system in which a preferred embodiment of the present invention is incorporated. As shown, a computer 100 includes a processor 104 and a system memory 136, both coupled to a system bus 106. Computer 100 also includes a hard drive controller 132, a video adapter 108, a bus bridge 112, and a network interface 130, all coupled to system bus 106. Hard drive controller 132 controls a hard drive 134. Video adapter 108 drives a display 110. Bus bridge 112 is coupled to an input/output (I/O) interface 116 via an I/O bus 114. I/O interface 116 affords communications with various I/O devices, such as a keyboard 118, a mouse 120, a compact disc drive 122, and a floppy disk drive 124.

Computer 100 is capable of communicating with a server 150 via a network 128 using network interface 130. Network 128 may be an external network such as the Internet, or an internal network such as an Ethernet or a Virtual Private Network (VPN).

During operation, an application may refer to a hardware or software component of computer 100 that utilizes direct memory access (DMA) to transfer data within computer 100. Processor 104 may function as a DMA manager and initializes data transfers via DMA engines 102.

Figure 2:
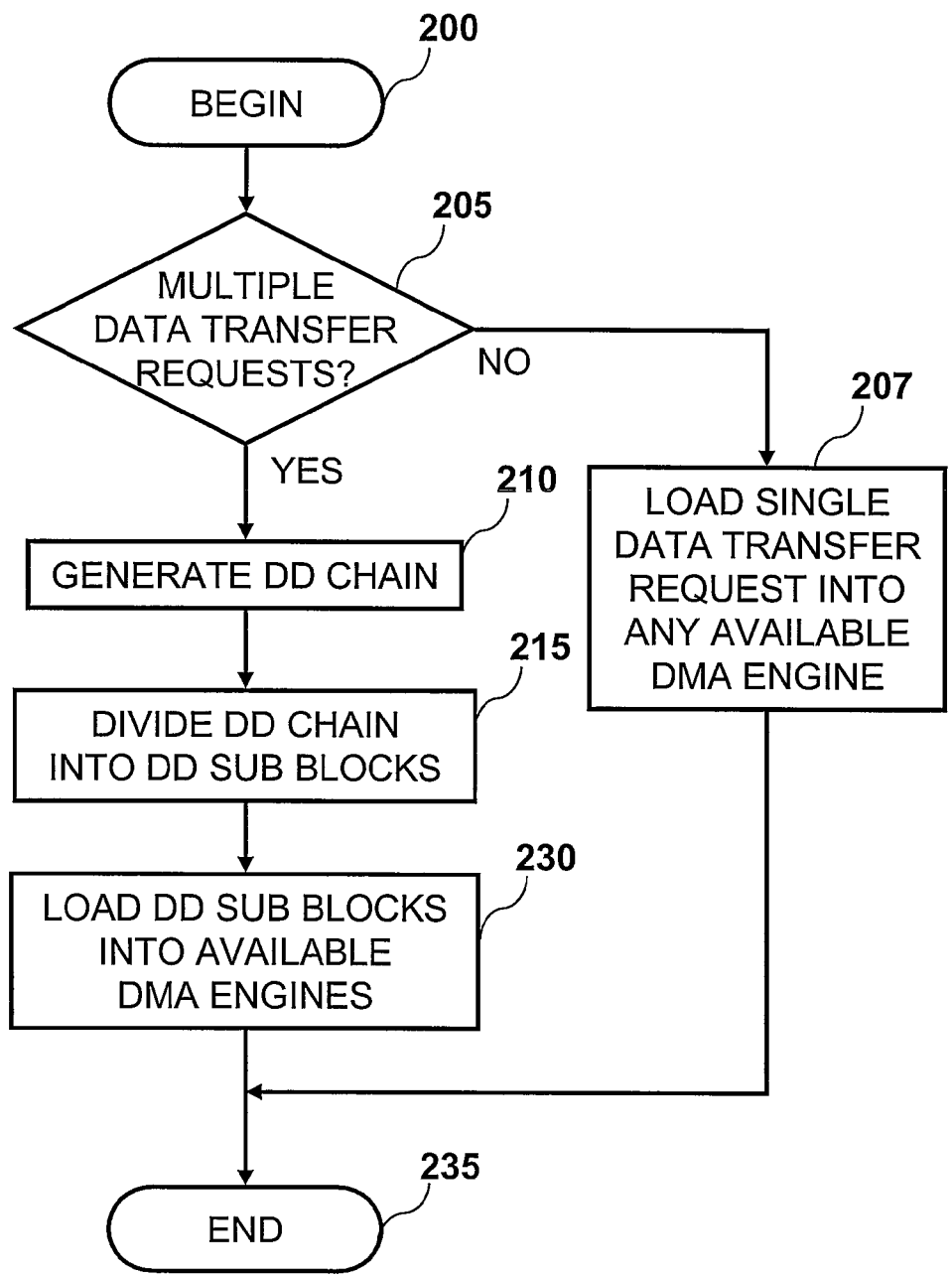
FIG. 2 is a high-level logic flow diagram of a method for handling multiple data transfer requests from one application within a computer system, in accordance with a preferred embodiment of the present invention.

With reference now to FIG. 2, there is depicted a high-level logic flow diagram of a method for handling multiple data transfer requests from one application within a computer system, in accordance with a preferred embodiment of the present invention. Starting at block 200, a determination is made as to whether or not multiple data transfer requests have been made by an application, as shown in block 205. If only a single data transfer request has been made by an application, the single data transfer request is loaded into any one of the available DMA engines, as depicted in block 207. However, if multiple data transfer requests have been made by an application, a data definition (DD) chain is generated for the multiple data transfer requests, as shown in block 210.

The generated DD chain is then divided into multiple DD sub-blocks, as depicted in block 215. The method for dividing a DD chain into multiple DD sub-blocks is further described in FIG. 3. The DD sub-blocks are subsequently loaded into respective available DMA engines, as shown in block 230. Each of the available DMA engines then performs data transfers on a corresponding DD sub-block until the entire DD chain has been completed, as depicted in block 235.

If the DMA manager has detected an error in a DMA engine within the pool of available DMA engines, the DMA manager executes an error handling function to identify the bad DMA engine from among the available DMA engines. A bad DMA engine is a DMA engine that has experienced a malfunction, such as an unrecoverable hardware error. The DMA manager removes any bad DMA engines from the pool of available DMA engines such that any bad DMA engines are not utilized in future processing.

Figure 3:
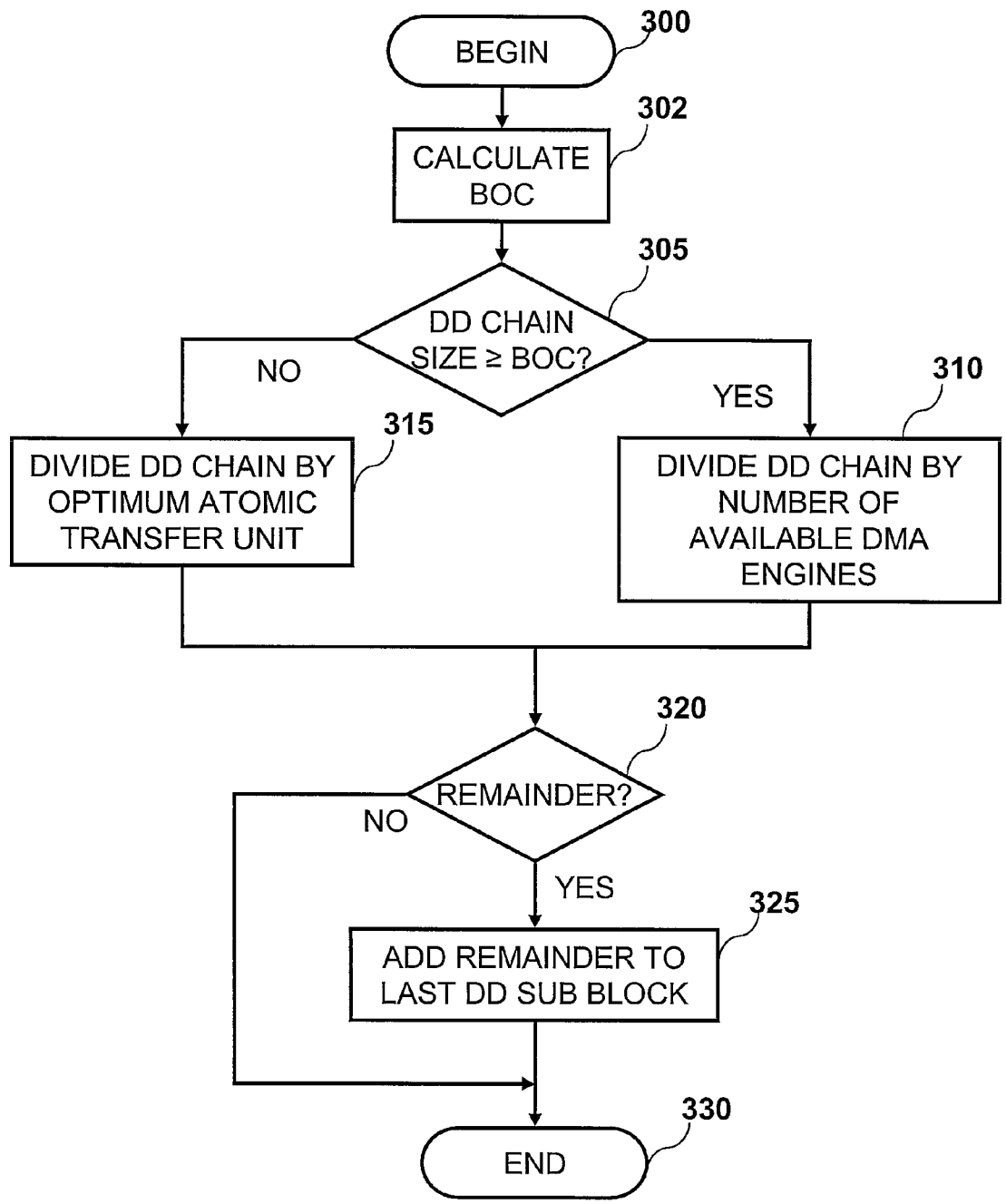
FIG. 3 is a high-level logic flow diagram of a method for dividing a data definition chain into multiple data definition sub-blocks, in accordance with a preferred embodiment of the present invention.

Referring now to FIG. 3, there is depicted a high-level logic flow diagram of a method for dividing a DD chain into multiple DD sub-blocks, in accordance with a preferred embodiment of the present invention. Starting at block 300, the DMA manager calculates the bandwidth of channels (BOC), as shown in block 302. The BOC (in bytes) is equal to an optimum atomic transfer unit (OATU) multiplied by the number of available DMA engines. The OATU (in bytes) is evaluated based upon various properties of a computer, such as the data transfer rate of a system bus, attributes of a processor, etc.

Next, a determination is made whether the size (in bytes) of the DD chain is greater than or equal to the BOC, as depicted in block 305. If the size of the DD chain is greater than or equal to the BOC, the DMA manager divides the size of the DD chain by the number of available DMA engines, as shown in block 310. As a result, the size of each DD sub-block equals to the number of available DMA engines. If the size of the DD chain is less than the BOC, the DMA manager divides the size of the DD chain by the OATU, as depicted in block 315. As a result, the size of each DD sub-block equals to the OATU.

Another determination is made whether a remainder (leftover bytes) exists after the division of the DD chain, as shown in block 320, via DD chain size MODULO number of available DMA engines. If there is no remainder, that means the number of DD sub-blocks are evenly distributed among the available DMA engines, and the division process is completed, as depicted in block 330.

Otherwise, if there is a remainder, the remainder is added to the last DD sub-block, as shown in block 325. If the size of the remainder is less than a user defined round-up value, the size of the last DD sub-block is set to equal to the size of the OATU plus the size of the remainder. If the size of the remainder is not less than the predefined round-up value, the size of the last DD sub-block is set to equal to the size of the remainder. After the last DD sub-block has been updated, the division process is completed, as depicted in block 330.

As has been described, the present invention provides a method and apparatus for handling multiple data transfer requests from one application within a computer system. The present invention increases the performance of a computer system by allowing multiple data transfers to be performed via multiple DMA engines.

While an illustrative embodiment of the present invention has been described in the context of a fully functional computer system with installed software, those skilled in the art will appreciate that the software aspects of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard drives, compact discs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for handling multiple data transfer requests from one application within a computer system, said method comprising:

in response to the receipt of a plurality of data transfer requests from an application, generating a data definition (DD) chain for said plurality of data transfer requests;

dividing said DD chain into a plurality of DD sub-blocks by determining a bandwidth of channels (BOC);

determining whether or not said BOC is less than said DD chain;

in a determination that said BOC is less than said DD chain, dividing said DD chain by a number of said available DMA engines; and in a determination that said BOC is not less than said DD chain, dividing said DD chain by an optimum atomic transfer unit (OATU);

determining whether or not there is a remainder;

in a determination that there is a remainder, adding said remainder to a last one of said DD sub-block;

determining whether or not said remainder is less than a predetermined round-up value;

in a determination that said remainder is less than said predetermined round-up value, setting the size of said last one of said DD sub-block to equal to the size of said OATU plus the size of said remainder;

in a determination that said remainder is not less than said predetermined round-up value, setting the size of said last one of said DD sub-block to equal to the size of said remainder; and loading said plurality of DD sub-blocks into a set of available direct memory access (DMA) engines, wherein each of said available DMA engines performs data transfers on a corresponding DD sub-blocks until said DD chain has been completed.

2. The method of claim 1, wherein said determining BOC further includes multiplying said OATU with said number of said available DMA engines.

3. The method of claim 1, wherein said OATU is determined based upon data transfer rate of a system bus and attributes of a processor.

4. A computer-readable storage medium having a computer program product for handling multiple data transfer requests from one application within a computer system, said computer-readable storage medium comprising:

program code for, in response to the receipt of a plurality of data transfer requests from an application, generating a data definition (DD) chain for said plurality of data transfer requests;

program code for dividing said DD chain into a plurality of DD sub-blocks by determining a bandwidth of channels (BOC);

determining whether or not said BOC is less than said DD chain;

in a determination that said BOC is less than said DD chain, dividing said DD chain by a number of said available DMA engines; and in a determination that said BOC is not less than said DD chain, dividing said DD chain by an optimum atomic transfer unit (OATU);

program code for determining whether or not there is a remainder;

program code for, in a determination that there is a remainder, adding said remainder to a last one of said DD sub-block;

program code for, determining whether or not said remainder is less than a predetermined round-up value;

program code for, in a determination that said remainder is less than said predetermined round-up value, setting the size of said last one of said DD sub-block to equal to the size of said OATU plus the size of said remainder;

program code for, in a determination that said remainder is not less than said predetermined round-up value, setting the size of said last one of said DD sub-block to equal to the size of said remainder; and program code for loading said plurality of DD sub-blocks into a set of available direct memory access (DMA) engines, wherein each of said available DMA engines performs data transfers on a corresponding DD sub-blocks until said DD chain has been completed.

5. The computer-readable storage usable medium of claim 4, wherein said program code for determining BOC further includes program code for multiplying said OATU with said number of said available DMA engines.

6. The computer-readable storage medium of claim 4, wherein said OATU is determined based upon data transfer rate of a system bus and attributes of a processor.

7. A computer system capable of handling multiple data transfer requests from one application, said computer system comprising:

means for, in response to the receipt of a plurality of data transfer requests from an application, generating a data definition (DD) chain for said plurality of data transfer requests;

means for dividing said DD chain into a plurality of DD sub-blocks by
determining a bandwidth of channels (BOC);
determining whether or not said BOC is less than said DD chain;
in a determination that said BOC is less than said DD chain, dividing said DD chain by a number of said available DMA engines; and
in a determination that said BOC is not less than said DD chain, dividing said DD chain by an optimum atomic transfer unit (OATU);

means for determining whether or not there is a remainder;

means for, in a determination that there is a remainder, adding said remainder to a last one of said DD sub-block;

means for, determining whether or not said remainder is less than a predetermined round-up value;

means for, in a determination that said remainder is less than said predetermined round-up value, setting the size of said last one of said DD sub-block to equal to the size of said OATU plus the size of said remainder;

means for, in a determination that said remainder is not less than said predetermined round-up value, setting the size of said last one of said DD sub-block to equal to the size of said remainder; and means for loading said plurality of DD sub-blocks into a set of available direct memory access (DMA) engines, wherein each of said available DMA engines performs data transfers on a corresponding DD sub-blocks until said DD chain has been completed.

8. The computer system of claim 7, wherein said means for determining BOC further includes means for multiplying said OATU with said number of said available DMA engines.

9. The computer system of claim 7, wherein said OATU is determined based upon data transfer rate of a system bus and attributes of a processor.

* * * * *